United States Patent [19]

Kurata et al.

[11] Patent Number: 5,111,449
[45] Date of Patent: May 5, 1992

[54] OPTICAL PICK-UP DEVICE USING DIFFRACTION GRATING ELEMENT HAVING TWO SUB-REGIONS

[75] Inventors: Yukio Kurata; Yoshio Yoshida, both of Tenri; Toshiya Nagahama, Yamatokoriyama, all of Japan

[73] Assignee: Sharp Kabushiki Kaisha, Osaka, Japan

[21] Appl. No.: 522,631

[22] Filed: May 11, 1990

Related U.S. Application Data

[63] Continuation-in-part of Ser. No. 340,442, Apr. 19, 1989, abandoned.

[30] Foreign Application Priority Data

Apr. 20, 1988 [JP] Japan ................... 63-97496

[51] Int. Cl.$^5$ ............................ G11B 7/00; G11B 7/013
[52] U.S. Cl. .................................. 369/44.37; 369/112; 369/122; 369/44.12; 369/44.14; 359/571; 359/569
[58] Field of Search ............ 369/109, 112, 121, 122, 369/44.37, 44.11, 44.12, 44.14, 44.17, 44.21, 44.23, 44.24; 350/161.17, 161.2

[56] References Cited

U.S. PATENT DOCUMENTS

| | | | |
|---|---|---|---|
| 4,665,310 | 5/1987 | Heemskerk | 369/44.12 |
| 4,753,513 | 6/1988 | Shikama | 369/112 |
| 4,771,411 | 9/1988 | Greve | 369/112 |
| 4,794,585 | 12/1988 | Lee | 369/44.23 |
| 4,817,072 | 3/1989 | Toide et al. | 369/44.23 |
| 4,835,378 | 5/1989 | Coops | 369/44.23 |
| 4,839,506 | 5/1989 | Bressers et al. | 369/112 |
| 4,847,478 | 7/1989 | Sugiura | 369/44.23 |
| 4,904,856 | 2/1990 | Nagahama et al. | 369/44 |
| 4,945,529 | 7/1990 | Ono et al. | 369/109 |
| 4,983,002 | 1/1991 | Shikama et al. | 369/109 |

FOREIGN PATENT DOCUMENTS

| | | |
|---|---|---|
| 0222238 | 5/1987 | European Pat. Off. |
| 0228620 | 7/1987 | European Pat. Off. |
| 0241942 | 10/1987 | European Pat. Off. |
| 0258450 | 3/1988 | European Pat. Off. |

*Primary Examiner*—Donald McElheny, Jr.
*Assistant Examiner*—Khoi Truong

[57] ABSTRACT

An optical pick-up device for focusing a laser beam emitted from a light emitting element through an optical system onto a recording medium. The beam is reflected from the recording medium and redirected through the same optical system on to a photodetector. A tracking error signal and a focusing error signal are produced from the output signals of the photo-detector. A diffracting element positioned before the light emitting element and the photo-detector and produces two sub-spots in two directions for applying the so-called 3-spots method from the laser beams that were projected from the light emitting element toward the recording medium. The diffracting element is divided into a first sub-region and a second sub-region formed in the same place and defined by a parting line aligned substantially perpendicular to the track direction. The first sub-region includes a diffraction grating for diffracting three beams that comprise a main beam toward the recording medium. The second sub-region includes a diffraction grating for diffracting the reflected beams of the three beams from the recording medium in the direction where the photo-detecting element is installed.

8 Claims, 12 Drawing Sheets

FIG. 6(a) FIG. 6(b) FIG. 6(c)
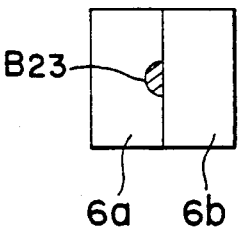 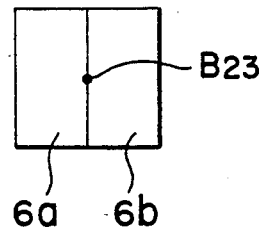 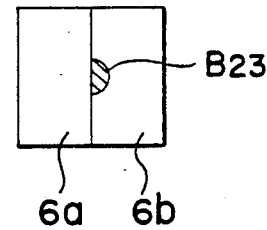
FIG. 7
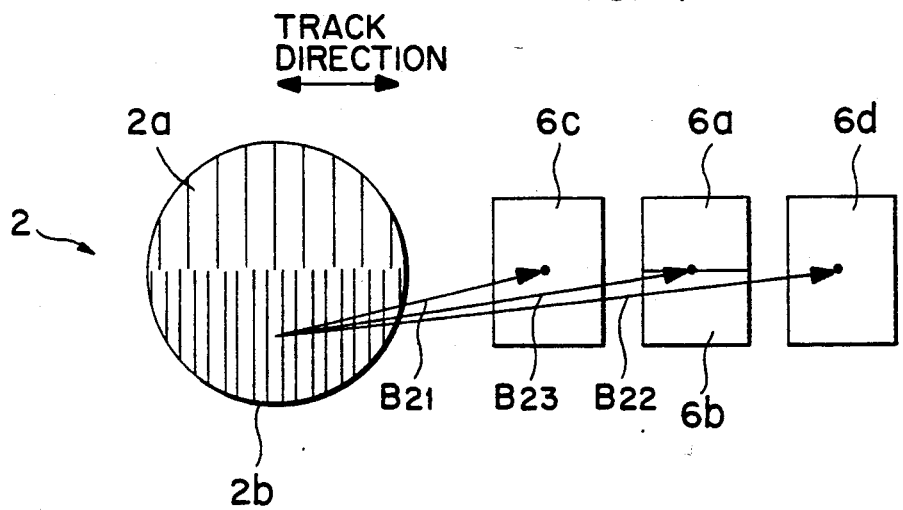
FIG. 8
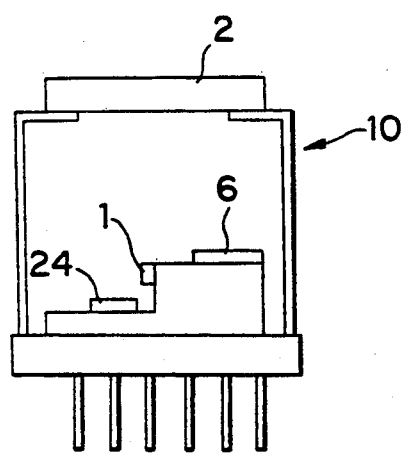
FIG. 9
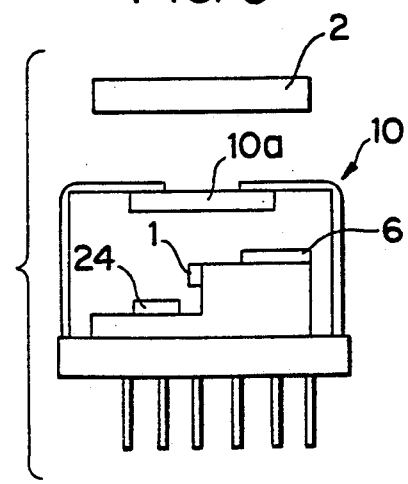

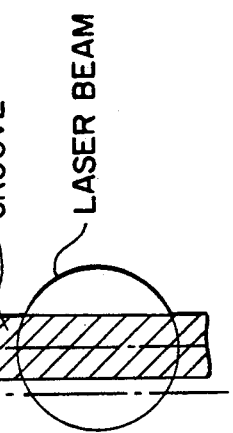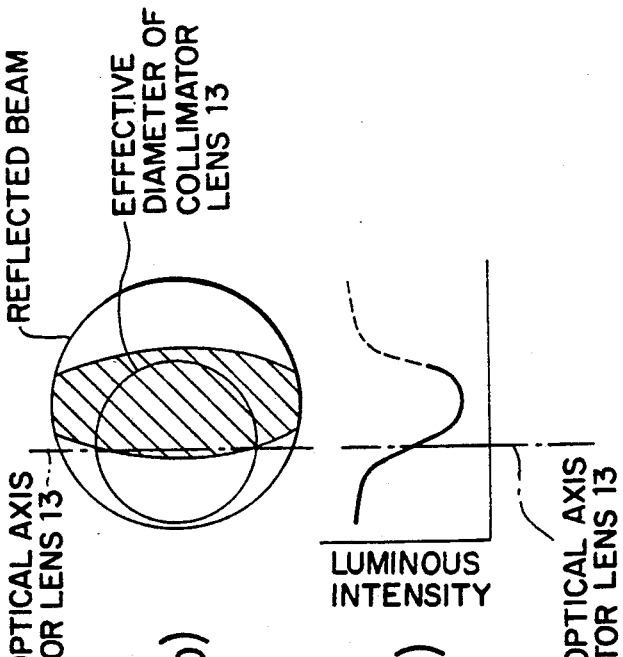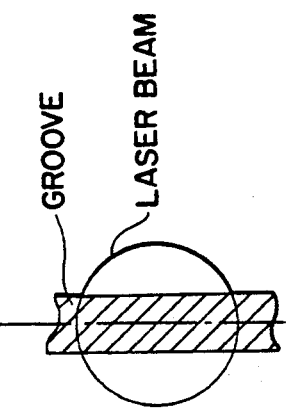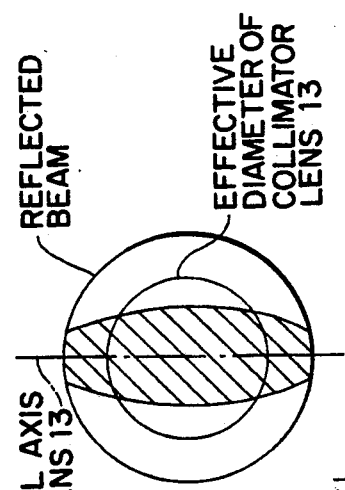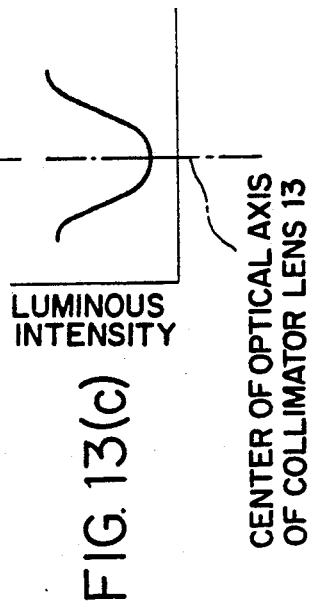

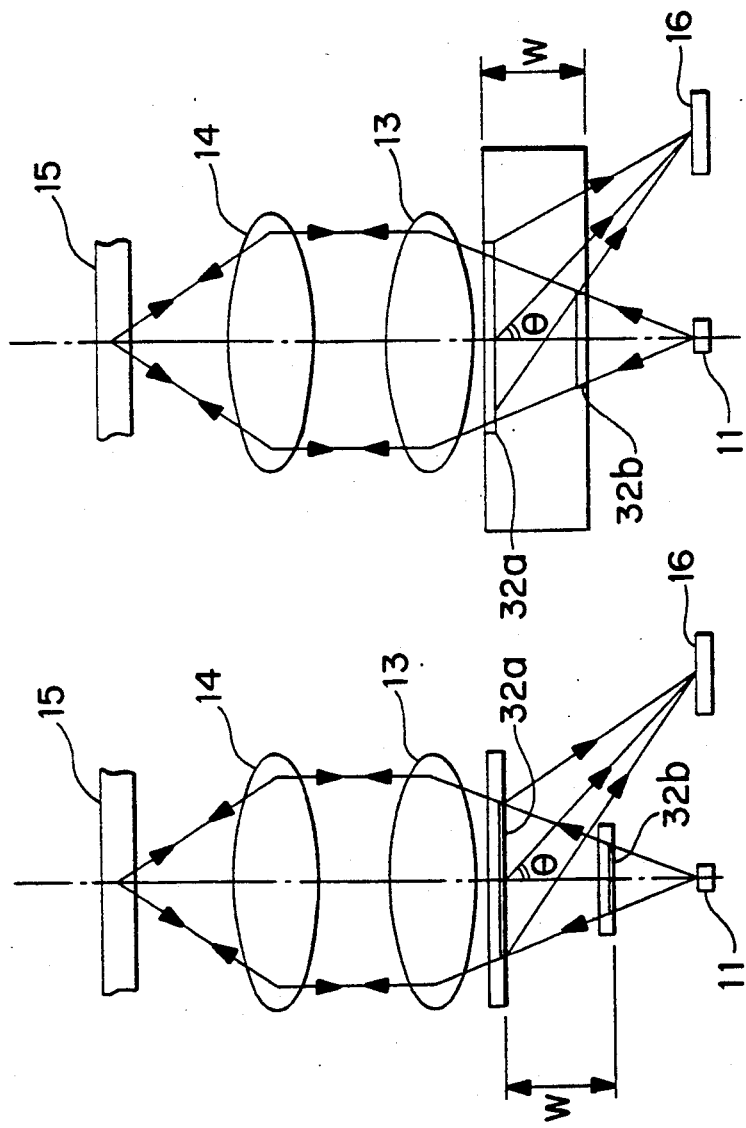

OPTICAL PICK-UP DEVICE USING DIFFRACTION GRATING ELEMENT HAVING TWO SUB-REGIONS

This application is a continuation-in-part application of U.S. application Ser. No. 07/340,442, filed Apr. 19, 1989, now abandoned.

FIELD OF THE INVENTION

The present invention relates to an optical pick-up device for a device such as CD [compact disk] player or video disk player.

BACKGROUND OF THE INVENTION

Common optical pick-up devices used in CD players and similar devices use the so-called 3-spot system having two sub-spots exclusively for detection of a tracking error signal with a main-spot for detection of regenerative information and focusing errors.

Meanwhile, an optical pick-up device has been developed which enables a reduction in the number of necessary optical parts by the use of a diffraction (hologram) element.

Examples of such conventional optical pick-up devices are shown in FIGS. 10 and 11.

In an optical pick-up device, such as shown in FIG. 10, a laser beam emitted from a light emitting element 11 first passes through a diffracting element 12. The diffracted beam of zero-order, having thus passed through the diffracting element 12, is focused on the recording face of a disk 15 through a collimator lens 13 and an objective lens 14.

Once reflected beam from the recording face of the disk 15 the beam again passes through the objective lens 14, the collimator lens 13 and the diffracting element 12.

The diffracting element 12 is divided by a parting line along the track direction of the disk 15 into two regions 12a and 12b different in diffraction directions.

The first-order diffracted beam in one region 12a of the diffracting element 12 is focused on the two divided photo-detecting elements 16a and 16b. The diffracted first-order beam in the other region 12b, is similarly focused on the other photo-detecting elements 16c and 16d.

The output signals Sa, Sb, Sc and Sd from these photo-detecting elements 16a, 16b, 16c and 16d are then converted into regenerative information signal RF, focusing error signal FE and tracking error signal TE, respectively, by means of the operational circuit shown in FIG. 11.

Thus, the regenerative information signal RF is detected as the sum of the output signals Sa, Sb, Sc and Sd through adding circuits 20, 21 and 23:.

$$RF = Sa + Sb + Sc + Sd.$$

The focusing error signal FE is detectable by applying the following operation to the output signals Sa, Sb, Sc and Sd according to the knife edge method:

$$FE = (Sb + Sc) - (Sa + Sd).$$

Also, the tracking error signal TE is detectable by applying the following operation to the output signals Sa, Sb, Sc and Sd consistent with the push-pull method:

$$TE = (Sc + Sd) - (Sa + Sb).$$

More specifically, the tracking error TE can be detected by the difference between the intensity of the two light fluxes of the laser beam divided by the parting line along the track direction.

Further, if the optical axis of the objective lens 14 should be off its normal position and/or inclined as a result of, for instance, the displacement of the optical axis of the objective lens 14 due to the tracking servo or other movement, the peak position in the laser beam's strength distribution is also displaced off center of the optical axis. This deviation of the peak position off center of the optical axis influences the difference between the intensity of the two light fluxes of the reflected laser beam divided in two directions.

The luminous intensity of the reflected light (return light) from a groove varies according to where the laser beam is irradiated on the groove, as described hereinbelow with reference to FIG. 12(a) to (d).

As illustrated in FIG. 12(a), the peak position of the luminous intensity of a laser beam irradiated on a groove of the disk 15 is located on the center of the optical axis. The luminous intensity distribution of the reflected light from the groove is such that, as shown in FIG. 12(b), the luminous intensity weakens in the proximity of the center of the optical axis and that it is symmetrical on both sides of the center of the optical axis. In comparison, as illustrated in FIG. 12(c), when the peak position in the luminous intensity of the laser beam irradiated on the groove is displaced off center of the optical axis, the luminous intensity distribution of the reflected light from the groove is not symmetrical on both sides of the center of the optical axis, as shown in FIG. 12(d). When detecting the tracking error signal using the push-pull method, the reflected light from the groove is led onto a two-division photo-detector and impinges on each photo-detecting element as divided in two at the center of the optical axis. Here, the difference in the quantity of light (luminous intensity) that impinges on each photo-detecting element is detected. Consequently, offset occurs when as described above, the peak position in the luminous intensity of the laser beam that was irradiated on the groove, is displaced off the center of the optical axis.

When executing the tracking control by moving the objective lens 14 solely, the centers of the optical axes of the objective lens 14 and the collimator lens 13 do not coincide causing the beam spot of the reflected light from the disk 15 to move right and left preventing accurate control. This problem is further explained with reference to FIGS. 13(a) to (c) and FIGS. 14(a) to (c).

As illustrated in FIG. 13(a), when the center of the optical axis of the collimator lens 13 and the center of the optical axis of the objective lens 14 coincide, the relationship between the reflected light from the disk 15 and the effective diameter of the collimator lens 13 is as illustrated in FIG. 13(b). The luminous intensity distribution of the reflected light, after it passes through the collimator lens 13, weakens in the proximity of the center of the optical axis of the collimator lens 13 and is symmetrical on both sides of the center of the optical axis, as shown in FIG. 13(c). In comparison, as illustrated in FIG. 14(a), when the center of the optical axis of the collimator lens 13 and the center of the optical axis of the objective lens 14 do not coincide, the relationship between the reflected light from the disk 15 and the effective diameter of the collimator lens 13 is as illustrated in FIG. 14(b). The luminous intensity distribution of the reflected light, after it passes through the collimator lens 13, becomes asymmetrical on both sides of the center of the optical axis, as shown in FIG. 14(c).

When the tracking error detection is performed using the push-pull method, the tracking state is considered to be ON-track when the luminous intensity distribution of the reflected light impinging upon the collimator lens 13 is identical in the two regions on the right and left of the center of the optical axis. Therefore, as illustrated in FIG. 14, although in reality the tracking is in the ON-track state, as the luminous intensity becomes asymmetrical on both sides, a difference arises between the quantities of light impinging on each region causing the tracking state to be considered OFF-track and preventing accurate tracking. That is during tracking, as the objective lens 14 is moved to the right and left in the direction of the track, the luminous intensity distribution of the reflected light that impinges upon each photo-detecting element of the two-division photo-detector becomes asymmetrical and a DC offset voltage is generated in the tracking error signal. This causes the laser beam to be irradiated off the accurate position on the track and thereby preventing an accurate tracking error signal detection.

Further with the push-pull method, the height of the pits with respect to the grooves on the disk 15 needs to be closely controlled as there may be instances where no intensity distribution occurs in the reflected light and the tracking error detection cannot be executed accurately. Namely, when the height of the pits is equal to $\frac{1}{4}$ of the wavelength of the laser beam, the diffraction of the light occurring due to the pits is most effective, and the presence or absence of pits can be distinguished with accuracy. However, as the luminous intensity distribution of the reflected light impinging on each photo-detecting element of the two-division photo-detector becomes always symmetrical, the pits need to be formed such that their height is inferior to $\frac{1}{4}$ of the wavelength of the laser beam.

As described above, conventional optical pick-up devices, which use a diffracting element for detecting the tracking error signal TE by the push-pull method, offset is likely to occur with respect to the tracking error signal TE. Hence if the optical axis of the optical system should deviate, only slightly, accurate tracking control is prevented.

With conventional optical pick-up devices that use a diffracting element for performing tracking using the 3-beam method, the thickness of the diffracting element needs to be greater than the prescribed thickness, and the grating pitch needs to be fabricated minutely in order to increase the angle of diffraction. Such diffraction elements are manufactured using a complex process. A conventional optical pick-up device which uses a diffracting element for tracking using the 3-beam method will be described hereinbelow with reference to FIGS. 15(a) and (b).

As illustrated in FIG. 15(a), a conventional optical pick-up device which uses a diffracting element for tracking using the 3-beam method, is provided with:

a diffracting element 32b that produces 3 beams, the element 32b being mounted in proximity of a photo-detecting element 16; and a diffracting element 32a that diffracts the reflected light from the disk 15 in the direction the photo-detecting element 16, the element 32a being mounted in proximity of the disk 15.

The three beams were produced by the diffracting element 32b are irradiated on the disk 15 across the collimator lens 13 and the objective lens 14. The three beams are then reflected back and impinged upon the diffracting element 32a across the objective lens 14 and the collimator lens 13. Two restrictions (1) and (2) must be observed when designing the diffracting element 32a, so that the reflected beams that are diffracted toward the photo-detecting element 16 do not impinge upon the diffracting element 32b, as follows:

(1) The distance W that separates the diffracting element 32a and the diffracting element 32b should be as wide as possible; and (2) The angle of diffraction $\theta$ at which the reflected beams are diffracted by the diffracting element 32a must be set as large as possible. Assuming $\lambda$ represents the wavelength of the light source and d represents the grating pitch of the diffracting element, the angle of diffraction $\theta$ should satisfy $\sin \theta = \lambda/d$. Accordingly, in order to increase the angle of diffraction $\theta$, the grating pitch d should be reduced.

In order to fulfill condition (1), when as illustrated in FIG. 15(b) the diffracting element 32a and the diffracting element 32b are mounted on the upper and lower faces of a single base (for example made of glass), the diffracting elements 32a and 32b must be mounted in exact positions with regard to each other and in reference to the thickness of the base. Such a conventional optical pick-up device suffers from the drawback that its manufacturing process is complex and that its overall cost is high. As to a conventional pick-up device as illustrated in FIG. 15(a), in addition to the disadvantages presented by the conventional optical pick-up device illustrated in FIG. 15(b), it suffers from the drawback that two diffracting elements must be installed.

In order to fulfill condition (2), the grating pitch is minute and must be fabricated very accurately, causing the cost of the overall device to increase. Moreover, as the angle of diffraction $\theta$ is increased, the photo-detecting element 16 has to be placed in a position distant from the light emitting element 11. When accommodating the photo-detecting element 16 and the light emitting element 11 in a common package, the size of the package itself increases and designing the device in a compact size thereby becomes difficult.

SUMMARY OF THE INVENTION

It is primary object of the present invention to provide an optical pick-up device whose manufacturing cost can be saved through reduction of the number of the optical parts and simplification of the manufacturing process of a diffracting element.

Another object of the present invention is to provide an optical system in which minor deviations by the reflected light offset from the optical axis of the optical system does not affect the tracking error signal.

Another object of the invention is to provide an optical system in which tracking control is unaffected by the height of the pits on a disk so as to enable accurate tracking servo control.

Another object of the invention is to provide an optical pickup device whose manufacturing cost can further be reduced by simplifying construction of the optical system.

In order to accomplish the aforementioned objects, the present invention relates to an optical pick-up device capable of detecting a laser beam emitted from a light emitting element through an optical system and focused the beam on a recording medium. The reflected beam from the recording medium is redirected through the same optical system onto a photo-detecting element. A tracking error signal and a focusing error signal are produced from the output signals of the photo-detecting element. The optical system includes a diffracting element, positioned before the light emitting element and the photo-detecting element, that produces two sub-spots in two directions from laser beams projected from the light emitting element onto the recording medium for applying the so-called 3-spot method, and that is divided into a first sub-region and a second sub-region formed on the same plane, by a parting line aligned substantially perpendicular to the track direction. The first sub-region diffracts three beams that include a main beam toward the recording medium, and the second sub-region diffracts the reflected beams of the three beams from the recording medium toward the photo-detecting elements.

With the above arrangement, the first sub-region is designed so as to diffract the laser beams traveling from the light emitting element to the recording medium, while the second sub-region is designed so as to diffract the reflected beams from the recording medium, enabling an accurate tracking control to be performed.

The aforementioned photo-detecting elements are provided in two groups. The two groups of photo-detecting elements may be disposed at two positions where the two first-order diffracted beams of the reflected beam from the recording medium diffracted by the aforementioned other sub-region of the diffracting element are focused respectively.

An alternative construction may be such that the blaze property is imparted to the aforementioned other sub-region of the diffracting element, and a group of photo-detecting elements are provided where the first-order beam of the higher optical intensity is focused.

The aforementioned other sub-region of the diffracting element may also be constituted so that the diffraction granting is formed to diffract the beam in the direction substantially perpendicular to the track direction.

Also, the photo-detecting element for detecting the beams of the main-spot reflected from the recording medium may be divided into two elements by the parting line parallel to the parting line dividing the sub-regions on the diffracting element, and may include an adding circuit which outputs the sum of the signals output from the individual respective elements of the photo-detecting element as the regenerative information signal, and a subtracting circuit which outputs a difference as the focusing error signal.

Also, it may include the light emitting element and the photo-detecting element being housed in a common package and a cap seal window. The cap seal window of the package may be composed of the diffracting element so as to further reduce the number of parts. In addition, in the case where the two sub-regions are formed in the same plane on the diffracting element, the photo-detecting element may be installed in close proximity to the light emitting element and the package thus designed in a small size.

BRIEF DESCRIPTION OF THE DRAWINGS

FIGS. 6(a)–(c) are plan views showing the principle of the knife edge method with reference to the photo-detecting elements respectively;

FIG. 7 is a view showing an inadequate arrangement of the photo-detecting elements;

FIG. 8 is a vertically-sectioned front elevation view of a package for the light-emitting element;

FIG. 9 is a vertically-sectioned front elevation view showing an example light-emitting element package;

FIGS. 13(a)–(c) are explanatory views showing that offset does not occur in the tracking error signal when, with the push-pull method, the center of the optical axis of a collimator leans and the center of the optical axis of an objective lens coincide;

FIGS. 14(a)–(c) are explanatory views showing that offset occurs with respect to the tracking error signal when with the push-pull method, the center of the optical axis of the collimator lens and the center of the optical axis of the objective lens do not coincide;

FIGS. 15(a)–(b) are organization charts showing the main parts composing the optical systems of conventional pick-up devices utilizing a diffracting element with the three-beam method;

DETAILED DESCRIPTION OF THE PREFERRED EMBODIMENTS

A preferred embodiment of the present invention will be described below with reference to the accompanying drawings FIGS. 1 through 9, FIG. 16, and FIGS. 17(a)–(b).

This embodiment relates to an optical pick-up device of CD player or similar device.

Figure 1A:
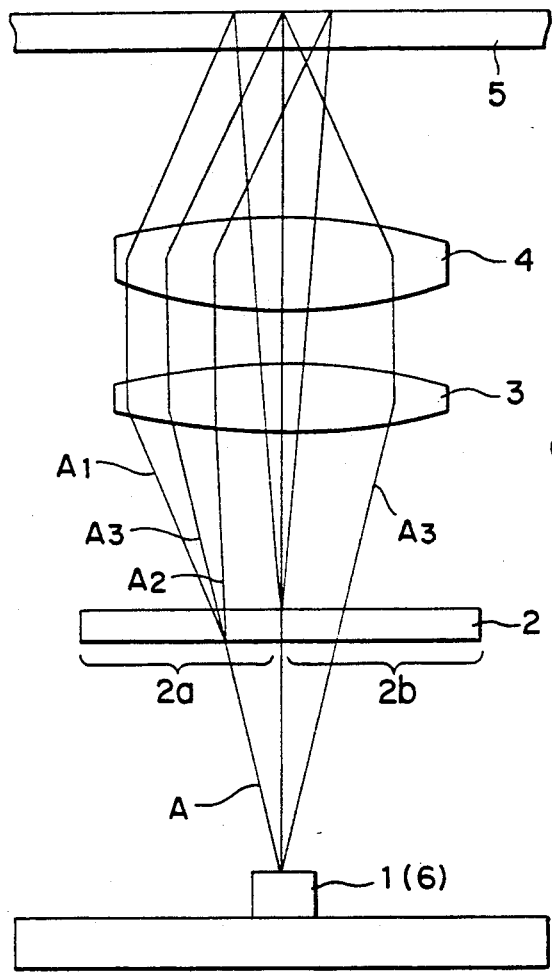
FIG. 1(a) is a side elevation view showing the optical path of a laser beam emitted from a light emitting element in an optical pick-up device of a preferred embodiment of the present invention.
Figure 1B:
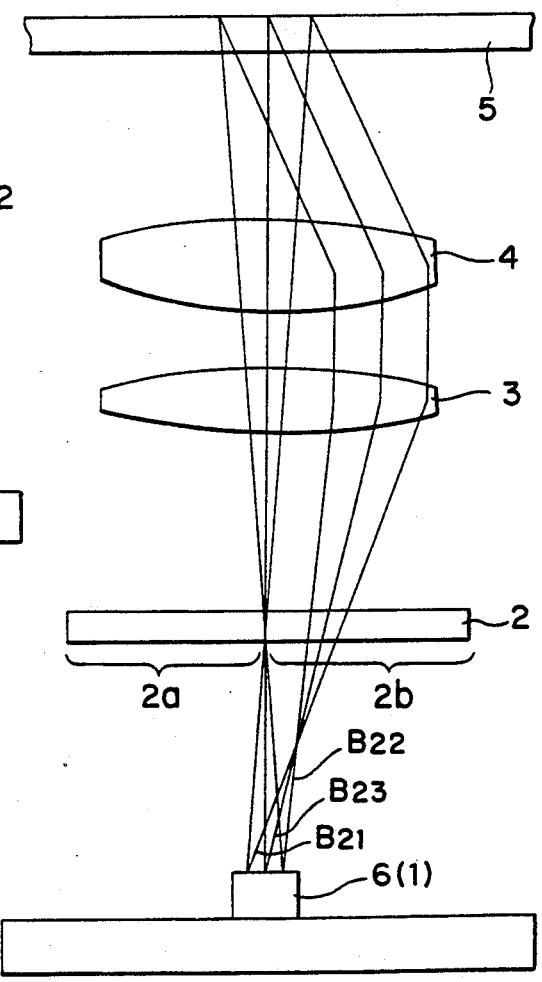
FIG. 1(b) is side elevation view showing an optical path of a reflected beam from a disk.
Figure 2:
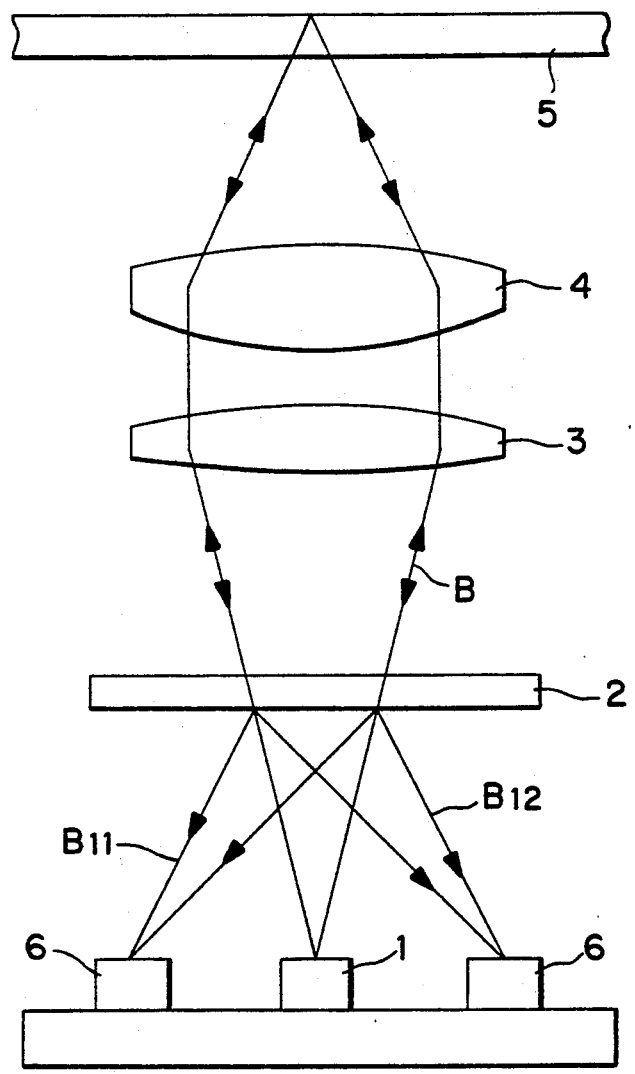
FIG. 2 is a front elevation view showing the individual optical paths.
Figure 16:
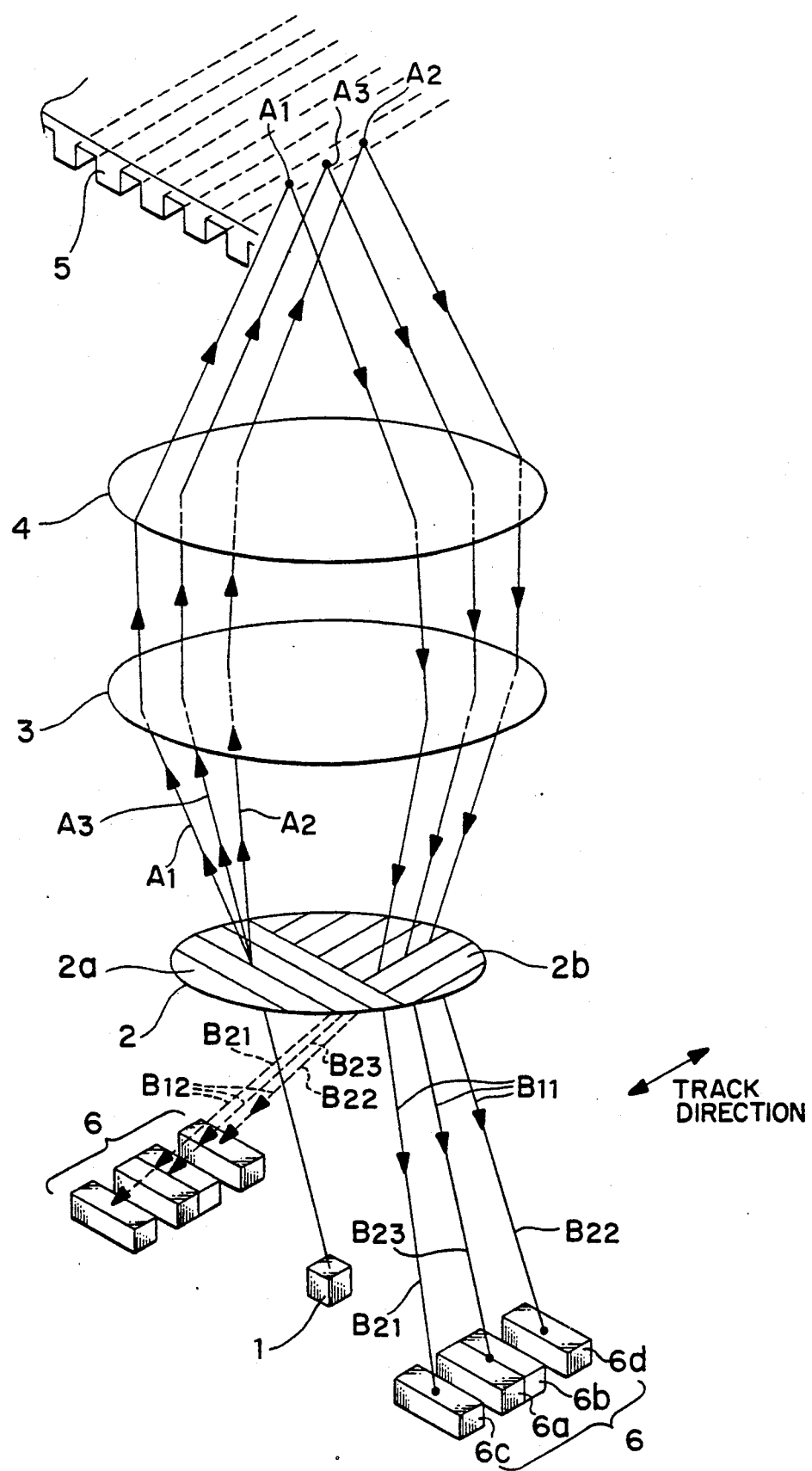
FIG. 16 is a conceptual chart showing the optical path of a laser beam emitted from a light emitting element until it reaches a photo-detecting element in an optical pick-up device of a preferred embodiment of the present invention.

As shown in FIG. 1, FIG. 2 and FIG. 16, diffracting element 2, collimator lens 3 and objective lens 4 are arranged in front of a light emitting element 1 of an optical pick-up device so that a laser beam A emitted by light emitting element 1 is led to the recording face of a disk 5.

The aforementioned diffracting element 2 is divided into two sub-regions 2a and 2b by a parting line approximately perpendicular to the track direction. A diffraction granting is formed in sub-region 2a which causes diffraction approximately in the track direction, as shown in FIG. 1(a). Plus one (+1) order diffracted laser beam A1 and minus one (−1) order diffracted laser beams A2 of a laser beam A form two outside sub-spots on the recording face of a disk 5 using the 3-spot method.

The main beam is constituted by a zero-order diffracted beam that passes through the sub-regions 2a and 2b, and forms a circular spot on the disk 5. The sub-spots are constituted by first order diffracted beams that pass through the sub-regions 2a and 2b, and form circular spots on the disk 5.

The other sub-region 2b of the diffracting element 2 has formed therein another diffraction granting which causes diffraction substantially perpendicular to the track direction, as shown in FIG. 2 and FIG. 16. That is, the +1 order diffracted beam B11 and the −1 order diffracted beam B12 of the reflected beam B from the disk 5 are both divided in directions perpendicular to the track direction.

Since in the other sub-region 2b no diffraction occurs in the track direction, as shown in FIG. 1(b) and FIG. 16, the aforementioned +1 order diffracted beam B11 and −1 order diffracted beam B12 are focused on the displaced positions in the track direction as beam B23 corresponding to the main-spot on the recording face of the disk 5, and as beams B21 and B22 corresponding to the two sub-spots.

The sub-region 2a in the diffracting element 2 diffracts only a portion of the laser beam emitted from the light emitting element 1 that impinges thereupon, to produce two sub-beams whose effective shapes are semi-circular, due to the +1 order and −1 order diffractions as well as half of the circular main beam due to the zero-order diffraction. The remaining half of the main beam is produced through the sub-region 2b due to the zero-order diffraction and the beams are directed to the disk 5. This will be explained hereinbelow with reference to FIG. 17(a).

Figure 17A:
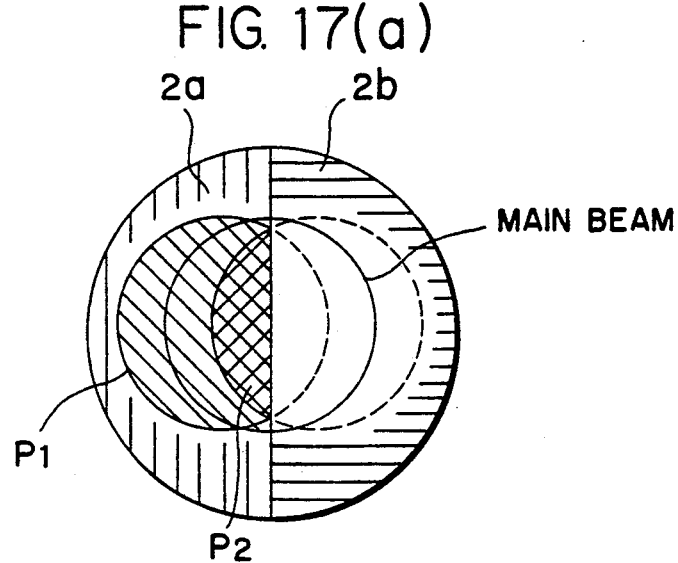
FIGS. 17(a)–(b) are explanatory views showing specimens of the cross-sectional luminous intensity distribution of beams impinging on and going out from two regions formed on a diffracting element.

When the laser beam emitted from the light emitting element 1 impinges upon the diffraction element 2, the +1 order diffracted beam and −1 order diffracted beam that were produced from the portion of the laser beam that impinged upon the sub-region 2a, become the sub-beams, and the zero-order diffracted beam that was produced from the portion of the laser beam that impinged upon both sub-regions 2a and 2b, becomes the main beam. The effective shapes on the diffracting element 2 for the cross sections of the three types of beams are as illustrated in FIG. 17(a). Namely, in the sub-region 2a, the effective shape for the cross section of the +1 order diffracted beam, is illustrated by P1 (shown by hatched lines in the figure) and the effective shape for the cross section of the −1 order diffracted beam is as illustrated by P2 (shown by cross-hatched lines in the figure). As to the effective shape for the cross section of the zero-order diffracted beam, it corresponds to a circle that is symmetrical on both sides on the sub-regions 2a and 2b. As clearly shown in FIG. 17(a), with such conditions, the sub-beams to be focused on the disk 5 are produced in the sole sub-region 2a, causing the intensity of the +1 order diffracted beam (corresponding to P1) to be greater than the intensity of the −1 order diffracted light (corresponding to P2).

Meanwhile, the sub-region 2b diffracts the reflected beams from the disk 5 (constituted by the three diffracted beams, i.e. the zero-order, the +1 order and the −1 order diffracted beams) that impinge thereupon toward the photo-detecting element. Namely, among the reflected beams from the disk 5, the +1 order and −1 order diffracted beams are diffracted toward the photo-detector 6 (photo-detecting elements 6c and 6d), and half of the circular zero-order diffracted beam is diffracted toward the photo-detector (photo-detecting elements 6a and 6b). This will be described hereinbelow with reference to FIG. 17(b).

Figure 17B:
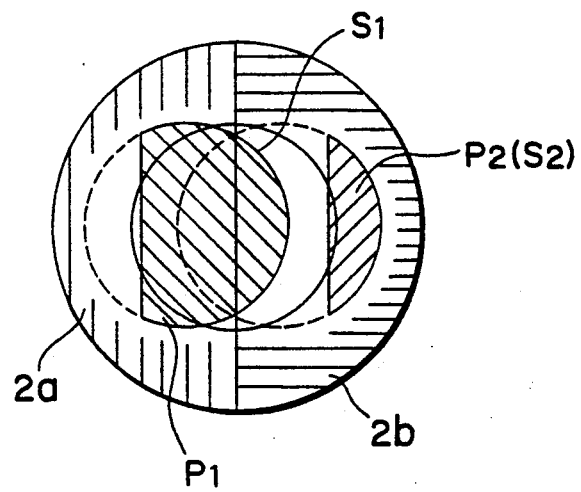

The main beam and the sub-beams that were irradiated on the disk 5, as described above, are reflected on the disk 5. The reflected beams impinge again upon the diffracting element 2 where only the portions of the beams that impinged upon the sub-region 2b are diffracted toward the photo-detector 6. The effective shapes of the cross sections of the three types of beams on the diffracting element 2 are illustrated in FIG. 17(b). Namely, in the sub-region 2b, the effective shape for the cross section of the +1 order diffracted beam, is as illustrated by S1 (a section of P1 mentioned earlier) (shown by hatched lines contained in a thick line in the figure), and the effective shape for the cross section of the −1 order diffracted beam is as illustrated by P2 (S2) (shown by hatched lines in the figure). As to the effective shape for the cross section of the zero-order diffracted beam, it corresponds to the right half of a circle that is symmetrical on both sides of the parting line dividing the diffracting element 2. As clearly shown in FIG. 17(b), with such conditions, in practice in the sub-beams described earlier, the portion in the +1 order diffracted beam that corresponds to S1 which is a section of the above P1, and the whole −1 order diffracted beam that corresponds to P2 (S2) are diffracted toward the photo-detector 6. As S1 and S2 are designed such as to have equal surfaces, there is no difference between the intensity of the +1 order and −1 order diffracted beams on the photo-detector 6.

The two sub-beams produced in the sub-region 2a of the diffracting element 2 are formed in different shapes. Therefore, a difference between the intensities of the sub-beams occurs when the sub-beams are irradiated on the disk 5. However, when the reflected beams from the disk 5 are diffracted by the sub-region 2b, as the sub-beams that impinge on the photo-detector 6 have almost similar shapes, the intensity is the same for each sub-beam.

Figure 4:
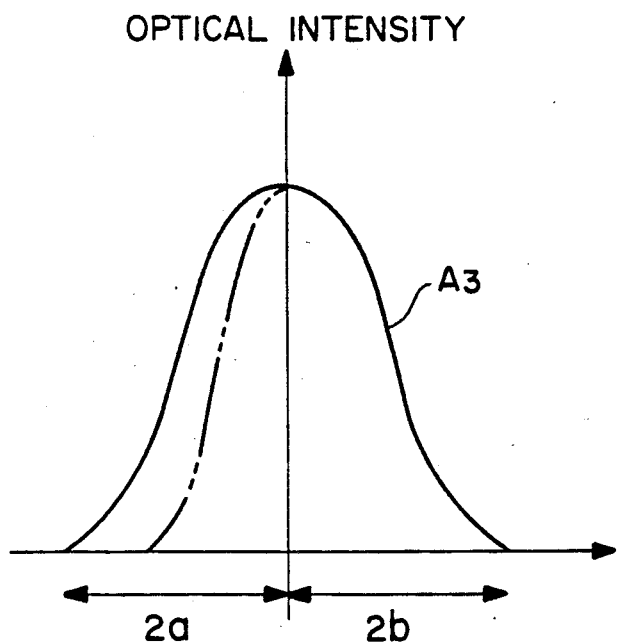
FIG. 4 is a diagram showing the distribution of the laser beam.

When the diffracting element 2 is constituted as hereinbefore described, the beam A3 forming the main-spot using the 3-spot method is formed by the zero-order diffracted beam generated as the laser beam A passes through the sub-regions 2a and 2b of the diffracting element 2. When the zero-order diffraction efficiency of the diffraction in one sub-region 2a is lower than that in the other sub-region 2b, the optical intensity of the optical line A3 forming the main spot becomes asymmetrical as indicated by the two-dot chain line as shown in FIG. 4. This results in deterioration of the regenerative signal. Hence, both sub-regions 2a and 2b of the diffraction element 2 are set to have the zero-order diffraction efficiencies to be as equal nearly as possible.

The parting line dividing the aforementioned diffracting element 2 is not an actual line but an imaginary one separating the sub-regions 2a and 2b.

For reasons of convenience, the grating lines of the diffracting element 2 are represented by straight lines in the figure. However in fact, as means to compensate for aberrations, the grating lines are formed in the shape of gentle curves. The period of the grating lines depends on the relative positions of the diffracting element 2, the light emitting element 1 and the focal point on the photo-detector 6. The grating period thus varies gradually in accordance with the above relative positions. In addition, when the height of the light emitting point on the light emitting element 1 and the height of the focal point on the photo-detector 6 are different, the diffracting element 2 also functions as a lens, and the shape of its grating is determined in accordance with the above relative positions.

On the substrate, the light emitting element 1 is provided with two photo-detectors 6 positioned on both sides of the light emitting element 1 in a direction perpendicular to the track direction. The two detectors 6 are respectively located where the +1 order diffracted beam B11 and −1 order diffracted beam B12 of the reflected beam B by the other sub-region 2b are focused respectively. It is so arranged that the detection sensitivity is increased through synthesis of the output signals from the aforementioned photo-detectors 6.

It is not absolutely necessary to provide two photo-detectors 6 on both sides of the light emitting element 1 as discussed above. It is also possible to impart the blaze property to the other sub-region 2b of the diffracting element 2, and, for example, to increase the optical intensity of the +1 order diffracted beam B11 and attain a sufficiently high sensitivity with only one photo-detector 6.

Figure 5:
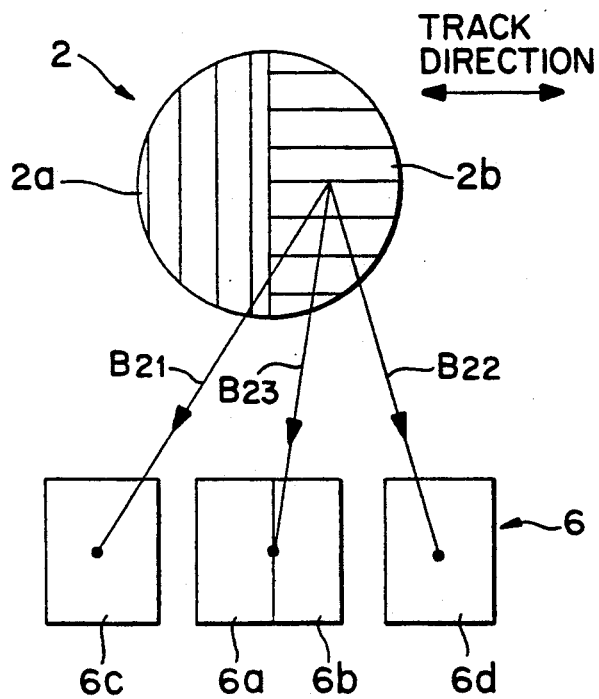
FIG. 5 is a plan view showing the arrangement of the photo-detecting elements.
Figure 10:
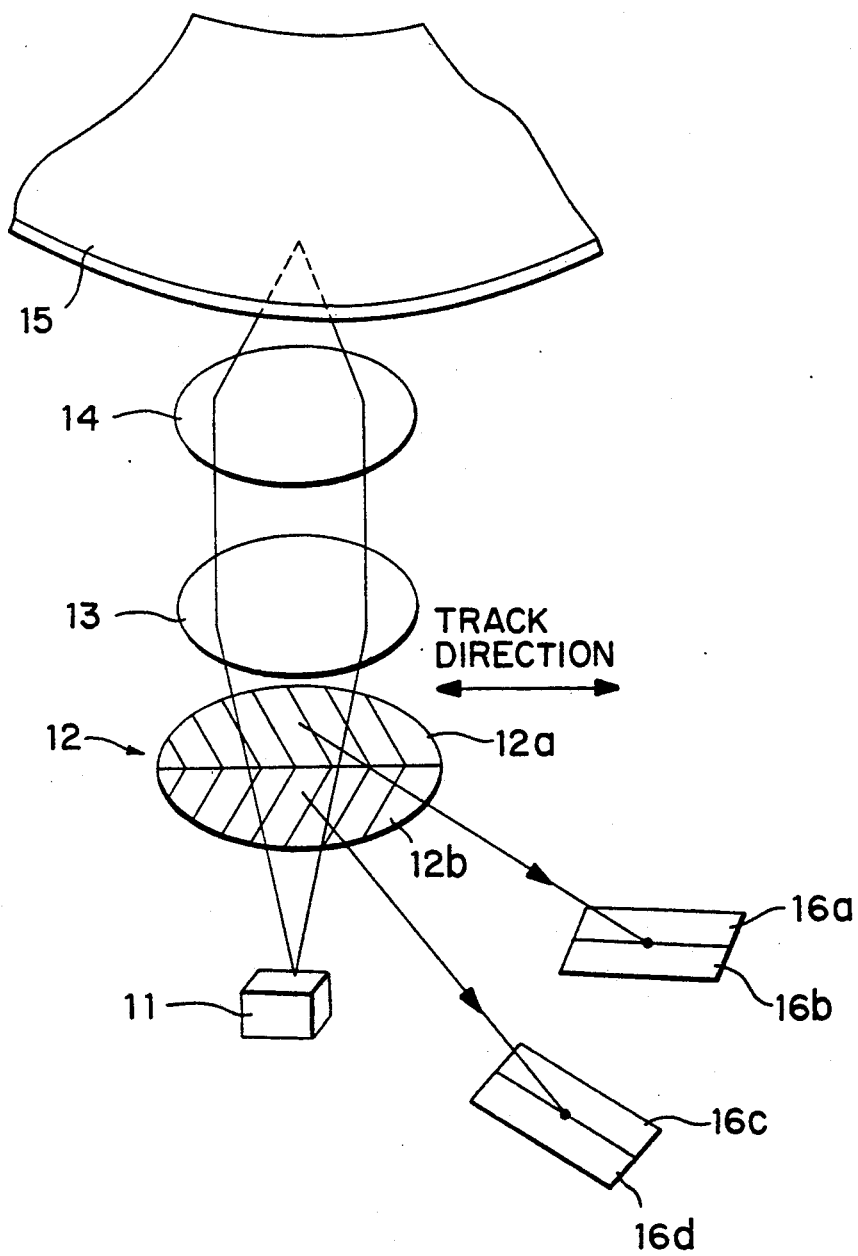
FIG. 10 is a perspective view showing a conventional optical pick-up device utilizing a diffracting element.
Figure 11:
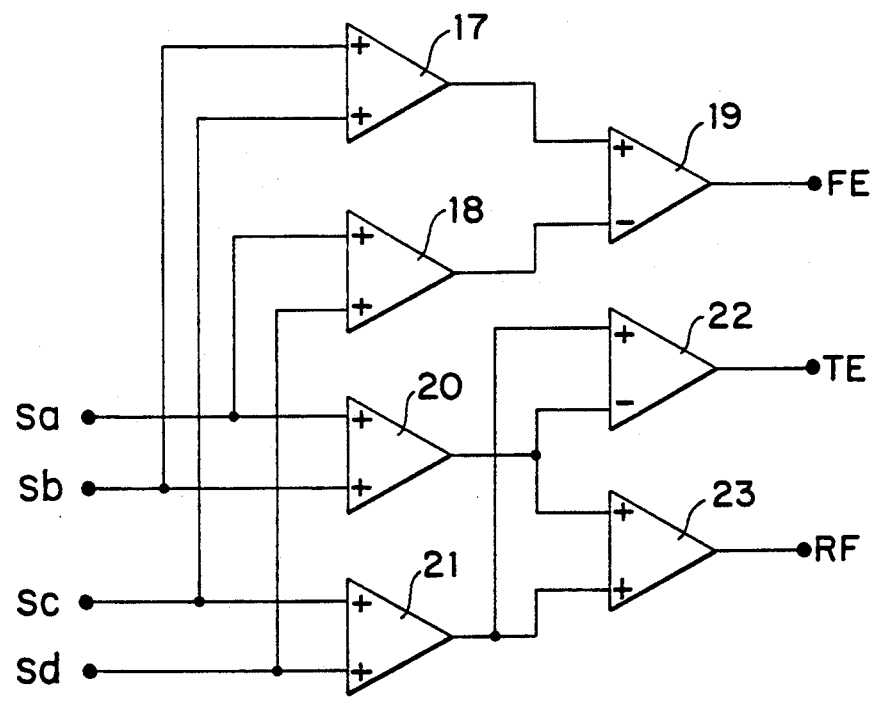
FIG. 11 is a block diagram showing the signal detection circuit of a conventional optical pick-up device utilizing the diffracting element.
Figure 12A:
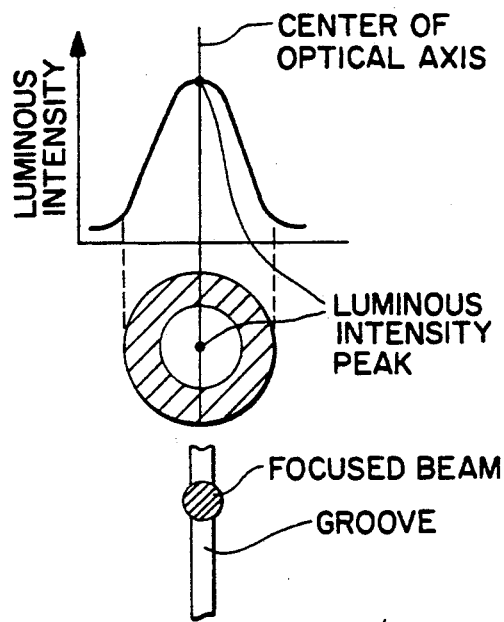
FIGS. 12(a)–(d) are explanatory views showing an offset occurring due to a shift in the peak of the luminous intensity of an incident beam.
Figure 12C:
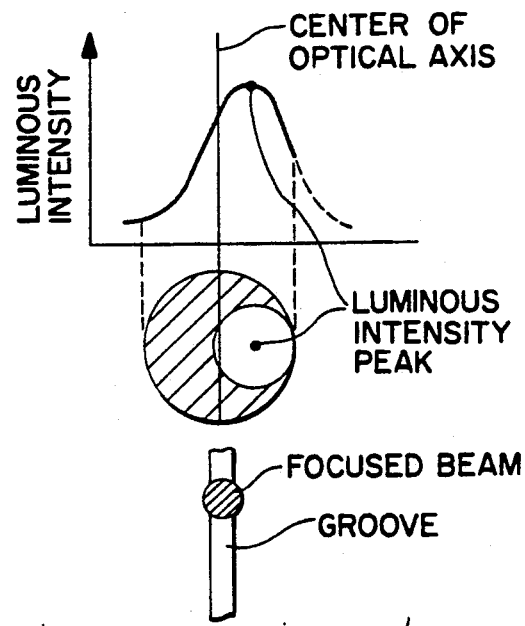
Figure 12B:
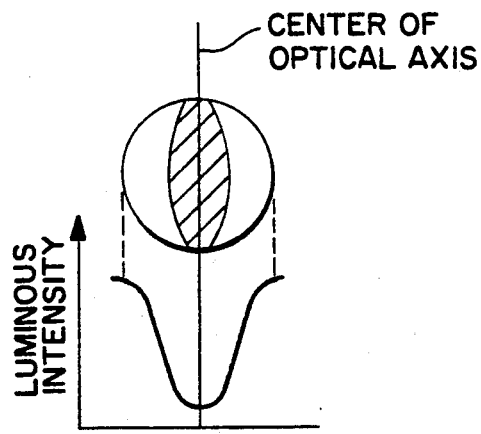
Figure 12D:
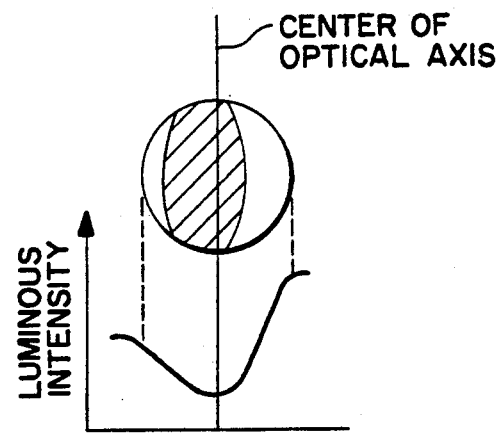

As shown in FIG. 5, the aforementioned photo-detector 6 includes four photo-detecting elements 6a–6d, each having individual outputs. Photo-detecting elements 6a, 6b are provided adjacently on both sides of a border line substantially perpendicular to the track direction and substantially parallel to the same direction of the parting line of diffracting element 2. The reflected beam B23 of the beam A3, which forms a main-spot on the disk 5, is irradiated on this border line. The photo-detecting elements 6c, 6d are disposed on both sides of the aforementioned photo-detecting elements 6a, 6b with respect to the track direction and receive the reflected beams B21, B22 of the beams A1, A2, which form sub-spots.

The aforementioned photo-detecting elements 6a–6b are formed to be sufficiently spaced in a direction perpendicular to the track direction so as to cope with variations in wavelength of the light emitting element 1 and/or displacement of the focal point as a result of assembly errors.

Figure 3:
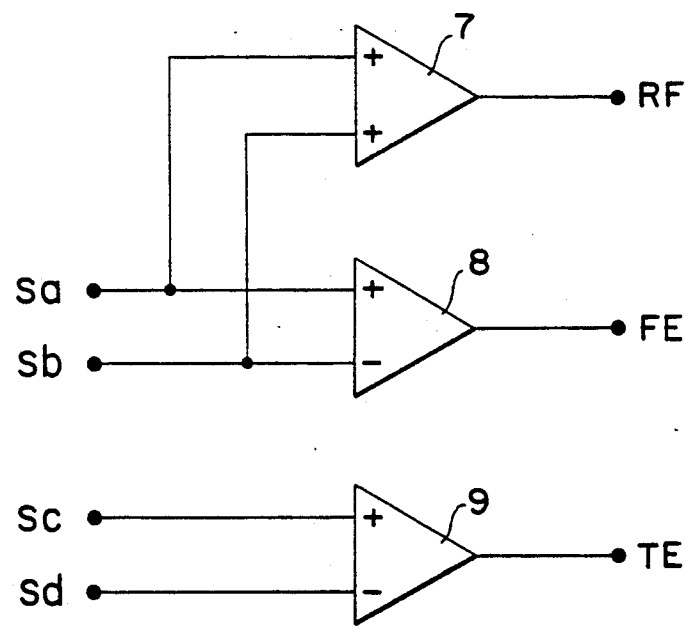
FIG. 3 is a block diagram showing the signal detection circuit.

It is so arranged that the output signal Sa, Sb, Sc and Sd from the aforementioned photo-detecting elements 6a, 6b, 6c and 6d are input to a signal detection circuit shown in FIG. 3. This signal detection circuit is composed of an adding circuit 7 and two subtracting circuits 8, 9.

The output signals Sa, Sb are added in the adding circuit 7 and then converted into regenerative information signal RF. Also these signals Sa and Sb are subtracted in the subtracting circuit 8 and converted into focusing error signal FE. The aforementioned signals Sc and Sd are also subtracted in the subtracting circuit 9 and converted into the tracking error signal TE.

The light emitting element 1 and photo-detector 6 are housed in package 10 in an integrated form. Monitoring photo-detector 24 is also housed in the package 10 to monitor the light intensity of the light emitting element 1. Normally such a package 10 has housed therein a light emitting element 1, photo-detector 6 and monitoring photo-detector 24 and is closed with a hermetically sealed glass window 10a to secure the elements from exposure to the atmosphere containing moisture and oxygen. In this case the diffracting element 2 is disposed before the glass window 10a.

In a preferred embodiment of the disclosed system, however, the diffracting element 2 is directly secured to the package 10 instead of the glass window 10a to seal the interior thereby. By this, the number of necessary parts can be reduced as well as the number of assembly steps.

A working mechanism of a preferred embodiment of the pick-up device of the composition described above is as described below.

The laser beam A emitted from light emitting element first passes through the diffracting element 2. The diffracted beam of zero-order whose luminous intensity has a cross section of a circular effective shape, having passed both sub-regions 2a, 2b is focused on the recording face of the disk 5 as the beam A3 to form the main-spot. Meanwhile, the diffracted beams of +1 and −1 order which occur as the laser beam A passes through one sub-region 2a of the diffracted element 2 and whose luminous intensities have cross sections of semi-circular effective shapes, are focused as beams A1 and A2 in two directions on the recording face of the disk 5 at two positions displaced forward and backward from the main-spot A3 in the approximately track direction and forms two sub-spots.

Then, only the portions of the beams reflected from the individual spots on the recording face of the disk 5 that impinge upon the sub-region 2b of the diffracting element 2, are diffracted toward and focused onto the photo-detector 6 (B21 to B23). For example, the reflected beam B23 is formed by the portion of the main beam incident on the diffracting element 2 that impinges upon the sub-region 2b and is diffracted (corresponding to half of the entire beam that impinged upon the diffracting element 2). The reflected beams B21 and B22 are forced by the portions in the sub-beams incident of the diffracting element 2 that impinged upon the sub-region 2b and were diffracted (corresponding to portions of the entire sub-beams that impinged upon the sub-region 2b) (see FIG. 17(b)).

The photo-detecting elements 6a, 6b of the photo-detector 6 are irradiated with the reflected beam B23 of the beam A3 which form a main-spot and the signals Sa, Sb are output according to the intensity thereof. These output signals Sa, Sb are added in the adding circuit 7 and are output as the regenerative signal RF.

The aforementioned reflected beam B23 is a part of the light flux of the reflected beam B passed through the other sub-region 2b of the diffracting element 2 diffracted from one side of the light flux divided by the parting line of the diffracting line of the diffracting element 2.

Hence, when the focal point of the laser beam A is matched as it is focused on the recording face of the disk 5, the reflected beam B23 is focused at a point on the border line between the photo-detecting elements 6a, 6b as shown in FIG. 6(b). When the laser beam A focusing on the recording face of the disk 5 is displaced, a semilunar spot is formed on the photo-detecting element 6a or 6b as the direction of the displacement as shown in FIGS. 6(a)(c).

Hence, in substantially the same manner as in the case of the knife edge method, focusing error signal FE is output from the subtracting circuit 8 from inputted signals Sa and Sb making it possible to detect the displacement of the focal point.

The photo-detecting elements 6c, 6d are irradiated with the reflected beams B21 and B22 of the reflected beams A1 and A2 forming sub-spots, and output signals Sc, Sd are output. The intensity of each of the reflected beams B21 and B22 varies in a direction opposite the tracking error according to the 3-spot method.

Hence, the tracking error signal TE is output from the subtracting circuit 9 having received the output signals Sc, Sd.

To simulate the effect of the knife edge method in detecting the focusing error signal FE, it is necessary to match the directions of the parting line dividing the diffracting element 2 into two sub-regions 2a and 2b with that of the border line between the photo-detecting elements 6a and 6b.

When the oscillation wavelength of the light emitting element 1 fluctuates, the diffracting angle of the reflected beam B diffracted by the diffracting element 2 is caused to be changed, and the focusing position o the photo-detector 6 is thereby displaced in the direction of diffraction. To prevent influence by this displacement of the focusing position, it is desirous to match the diffracting direction with that of the border line between the photo-detecting elements 6a, 6b.

Hence, the direction of the parting line between the subregions 2a, 2b of the diffracting element 2 coincident with the diffracting direction 2b of the diffracting element 2 as well as with the direction of the border line between the photo-detecting elements 6a and 6b.

It is further desirous to minimize the distance between the two sub-spots formed on the recording face of the disk 5 to prevent the offset of the tracking error signal TE due to the difference in radius of curvature between the tracks on the inner periphery side and the outer periphery side. The distance between the sub-spots is minimized preferably also for preventing the deterioration of the detecting precision of the tracking error signal TE due to the positioning error as the pick up device is attached to a CD player or the like.

As to the photo-detecting elements 6c, 6d, it is essential that these be disposed on both sides of the element 6a along the track direction of the photo-detecting element 6a, 6b. Hence, it is preferable to set the distance between the aforementioned photo-detecting elements 6c and 6d as small as possible.

As mentioned above, the diffraction angle of the reflected beam B diffracted by diffracting element 2 varies according to the variation of the oscillation wavelength of the light emitting element 1. Hence, to ensure against the focusing position of the reflected beam B being not off the photo-detecting elements 6a–6d, it is desired to set the dimension of the photo-detecting elements 6a–6d in the direction of the diffraction of the reflected beam B as large as possible.

When, however, the photo-detecting elements 6a–6d are disposed with respect to the track direction as shown in FIG. 7, it is difficult to meet the two requirements of having the distance between the photo-detecting elements 6a, 6d minimized, and setting the dimension of the photo-detecting elements 6a–6d in the diffraction direction of the reflected beam B as large as possible.

Hence, it is desirable, as shown in FIG. 5, to set the diffracting direction of the other sub-region 2b of the diffracting element 2 approximately perpendicular to the track direction and to have the photo-detecting elements 6a–6d set on the diffraction side of the aforementioned other sub-region 2b with respect to the diffracting element 2.

The sub-spot formed on the recording face of the disk 5 is preferably formed approximately oval with its long axis parallel to the track direction. Sub-region 2a of the diffracting element 2, which the beams A1, A2 forming sub-spots are apart from the laser beam A, is desirous to be of a smaller dimension and fewer diffraction gratings in the track direction than sub-region 2b.

For the reasons described above, it is preferable to have the sub-regions 2a, 2b divided in two by a parting line crossing the track direction approximately at right angles it is then possible to detect tracking error signal TE and other signals not including offsets, regardless of the variation in wavelength. The manufacturing cost can be lowered by increasing the allowable range for the position at which the optical pick-up device is attached.

Thus, the present invention relates to an optical pick-up device for focusing a laser beam emitted from a light emitting element on a recording medium through an optical system. The reflecting beam from the recording medium is focused o the photo-detecting element through the same optical system and from which a tracking error signal and a focusing error signal are produced from the output signals of a photo-detecting element. A diffracting element, positioned before the light emitting element and the photo-detecting element, produces two sub-spots in two directions for applying the so-called 3-spot method from the laser beams projected from the light emitting element on to the recording medium. The diffracting element is divided into a first sub-region and a second sub-region formed on the same place by a parting line aligned substantially perpendicular to the track direction. The first sub-region diffracts three beams including a main beam toward the recording medium, and the second sub-region diffracts the reflected beams from the recording medium of the three beams toward the photo-detecting element.

The blaze property may be imparted to the aforementioned other sub-region of the diffracting element, and a group of photo-detecting elements may be disposed where the first-order beam of highest optical intensity is focused.

The aforementioned other sub-region of the diffracting element may as well be of such composition that the diffraction granting is formed so as to diffract the beam in the direction substantially perpendicular to the track direction.

The photo-detecting element for detecting the beam reflecting from the main-spot on the recording medium is divided into two elements by a parting line parallel to the parting line dividing the region on the diffracting element. There is provided an adding circuit for outputting the sum of the signals output from the respective elements of the photo-detecting element as a regenerative information signal. Also provided is a subtracting circuit which outputs the difference as the focusing error signal.

It may as well be of such composition that the light emitting element and the photo-detecting element are housed in a same package and the cap seal window of the package may be composed of the diffracting element.

A optical pick-up device of such a composition enables detecting the focusing error signal by a sort of knife edge method similar to the prior art method cited, and also the tracking error signal can be detected by the 3-spot method which is known to be highly reliable for the tracking error signal, hence there is no problems of offset being caused with regard to the tracking error signal due to displacement of optical axis in the optical system (the occurrence of offset cannot be avoided when detecting the luminous intensity distribution of the reflected beams from the recording medium through the push-pull method). In addition, the diffracting region for producing the three beams and the diffracting region for directing the reflected beams from the recording medium on to the photo-detecting element, are formed in the same plane on a single diffracting element. The number of parts may be thus reduced and the cost cut down.

Hence, accurate tracking servo control is feasible with the number of parts of the optical system being reduced by the use of the diffracting element.

Also it is possible to house both aforementioned light emitting element and photo-detecting element integrated in a common housing, using the diffracting element as its cap seal window, this enabling further lowering of the manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An optical pick-up device comprising:
    a light emitting element for emitting a light beam;
    an optical system for focusing said light beam onto a recording medium and also for focusing said light beam reflected from said recording medium back through said optical system;
    photo-detecting means for producing a tracking error signal and a focusing error signal from said reflected beam;
    diffracting means for diffracting said light beam toward said recording medium and for diffracting said reflected beam onto said photo-detecting means;
    wherein said diffracting means, positioned before said light emitting element and said photo-detecting means, produces two sub-spots in two directions for applying the 3-spot method from said light beam projected by said light emitting element toward said recording medium, and including a first sub-region and a second sub-region formed in the same plane and defined by a parting line aligned substantially perpendicular to the track direction of said recording medium;
    said first sub-region having a diffraction grating for diffracting said light beam into three beams including a main beam refracted toward said recording medium; and
    said second sub-region having a diffraction grating for diffracting the reflected beams of said three beams from said recording medium toward said photo-detecting means.

2. An optical pick-up device according to claim 1, wherein said photo-detecting means comprises two groups of photo-detecting elements positioned for receiving said three reflected beams as diffracted by said second sub-region of said diffracting means.

3. An optical pick-up device according to claim 1, wherein said second sub-region of said diffracting element is blazed.

4. An optical pick-up device according to claim 1, wherein the second sub-region of said diffracting means is formed so as to diffract said three beams in a direction substantially perpendicular to the track direction.

5. An optical pick-up device according to claim 1, wherein said photo-detecting means further comprising adding circuit means for outputting the sum of the signals from said photo-detecting means for producing regenerative information signal and a subtracting circuit means for outputting a difference for producing a focusing error signal.

6. An optical pick-up device according to claim 1, further comprising means for housing said light emitting means and said photo-detecting means in a common package, said housing means having a cap seal window composed of said diffracting means.

7. An optical pick-up device according to claim 1, wherein said first sub-region having a diffraction grating aligned substantially parallel to said first predetermined direction and substantially perpendicular to said second sub-region.

8. An optical pick-up device according to claim 1, wherein said photo-detector means is positioned relative to said optical recording medium and said diffraction means for receiving first order diffracted beams of said three beams as diffracted by said second region.

* * * * *